April 9, 1968     E. SCHOPPE, JR., ET AL     3,376,882
FLUID LOGIC ANTI-COINCIDENCE DEVICE BY CANCELLATION
Filed June 24, 1964
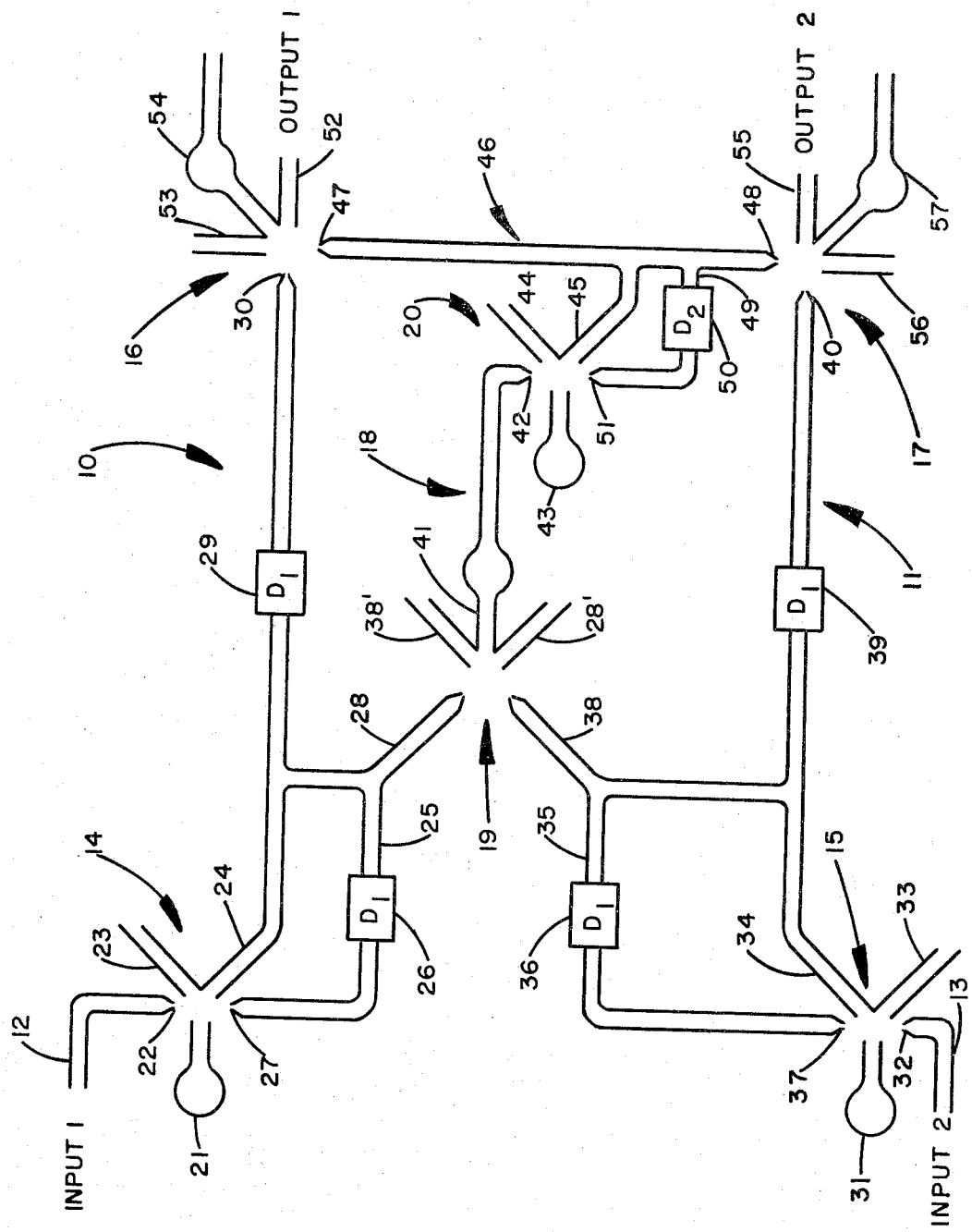
*INVENTOR.*
EDWARD SCHOPPE, JR.
CAVAS M. GOBHAI
BY
Lawrence H. Patton
AGENT

United States Patent Office 3,376,882
Patented Apr. 9, 1968

3,376,882
FLUID LOGIC ANTI-COINCIDENCE DEVICE BY CANCELLATION
Edward Schoppe, Jr., Walpole, and Cavas M. Gobhai, Cambridge, Mass., assignors to The Foxboro Company, Foxboro, Mass., a corporation of Massachusetts
Filed June 24, 1964, Ser. No. 377,548
1 Claim. (Cl. 137—81.5)

This invention relates to fluid logic devices wherein binary actions are provided, with no moving parts, and in compact units.

This invention particularly provides means for dynamically relating one fluid pulse train to another on a continuous flow basis, to establish both trains in useful condition for later operation with no pulse in one train in coincidence with a pulse in the other.

This device is useful and important in many applications. For example, it is useful in arithmetic units wherein it is necessary that pulses from different trains be applied as an input without coincidence.

The specific device of this invention is operated on the concept that when a pulse from one train coincides with that of another they are canceled out and provide a zero output signal in the normal output. Associated outputs in such a coincidence situation, however, provide a single signal for each pulse of the train. Therefore, with suitable apparatus these two single signal outputs can be added in to the output later, on a non-concidence basis. Thus in special situations, none of the pulses would be lost. In subtractive situations cancellation of coincident signals has no effect.

The primary concept of this anti-coincidence device is to cancel out coincidence signals to produce a zero output and to proceed with the two pulse trains in non-coincidence outputs and without the canceled signals.

This invention therefore provides a new and useful fluid logic system in which an anti-coincidence function is provided with respect to pulses of two pulse trains.

Other objects and advantages of this invention will be in part apparent and in part pointed out hereinafter and in the accompanying drawing, wherein:

The drawing is a schematic illustration of the device in accordance with this invention.

In the drawing the fluid flow is from left to right, and there are two main fluid systems, top and bottom, as at 10 and 11. The pulse train input for the system 10 is indicated at 12 and the pulse train input for the system 11 is indicated at 13. These inputs are preferably in the form of pulses. If they are step signals the input is preferably provided with pulse forming means to substitute a pulse for each step.

Each of the systems is provided with an input flip-flop unit as at 14 in the system 10, and at 15 in the system 11, and an output gate as a passive unit 16 in the system 10, and a passive unit 17 in the system 11.

There is a central common system 18 comprising a passive gate 19, followed by a flip-flop unit 20.

The systems 10 and 11 duplicate each other. In the system 10 the flip-flop unit 14 is provided with a power source 21, a side control 22 from the input passage 12, a vented output 23, and an operating output 24. From the operating output 24 there is a feedback 25 through a delay 26 to a control 27 in opposition to the input control 22.

In the system 10, also, from the output passage 24, there is a branch passage 28 leading to the common gate 19. The system 10 continues from the flip-flop output 24 through a delay 29 to the "and" gate 16 as one of the inputs at 30. Similarly in the system 11 the flip-flop 15 has a power source 31, an input control 32 from the passage 13, an output vent at 33, a working output passage 34, and a feedback 35 through a delay 36 to form the control 37 opposing to the input control 32.

In the system 11, in the same fashion as in the system 10, the output 34 has a branch 38 leading to the common "and" gate 19.

The working output passage 34 of the system 11 continues through a delay unit 39, to provide a control input 40 to the "and" gate 17.

The common "and" gate 19 is provided with a vent 28' for exhausting a signal from the system 10 passage 28, when there is no signal in the system 11 passage 38. Similarly the "and" gate 19 is provided with a vent passage 38' which exhausts fluid from the system 11 passage 38, when there is no signal in the system 10 passage 28.

In the common "and" gate 19, when there is a signal both in the system 10 passage 28 and the system 11 passage 38, these signals meet in the "and" gate and divert each other to the common output 41 of the "and" gate 19. This output leads to a control input 42 for the flip-flop unit 20 of the common system. The flip-flop 20 is provided with a power source 43 and a vent output 44. The other output of the flip-flop 20 is a working output at 45 which leads to a cross passage 46, which in turn, provides a control signal to both the "and" gates 16 and 17 in the systems 10 and 11 as at 47 and 48.

The common flip-flop unit is further provided with a feedback passage 49 from the transverse passage 46 through a delay 50 to provide a control input 51 to the flip-flop 20 in opposition to the control input 42 therefor which derives from the common "and" gate 19.

Finally, with respect to the "and" gates of the system 11 as at 16 and 17, the "and" gate 16 is provided with a vent 52 as an outlet for the control input 30, when there is no signal in the cross passage 46. Similarly a vent 53 is provided for signals in the passage 46 when there is no signal in the input control 30.

When there are signals for the "and" gate 16 both in the control inputs 30 and 47, the signals deflect each other in the "and" gate and both exit as a common signal from a common output 54.

In the system 11 with respect to the "and" gate 17, similarly, there is a vent 55 for the input control passage 40 when there is no signal in the input control 48, and there is a vent passage 56 for the input control passage 48 when there is no signal in the input passage 40. Further, the "and" gate 17 has a common output passage 57 which receives a signal when there is an input signal both in the control passage 48 and the control passage 40.

When there is a signal in the system 10 input 22, that is, a pulse, and no pulse in the system 11 signal input 32, the following situation holds. The input signal at 22 operates the flip-flop 14 which is normally at reset and venting through the passage 23. It operates the flip-flop to provide an operating signal in the output 24 as a step function which, however, is cut off so quickly as to essentially be a pulse. This signal in the output 24 proceeds in three directions. One is through the delay 29, the other is through the branch passage 28, and the other is through the feedback passage 25. The relationship between the feedback delay 26 and the output delay 29 is such as to allow, in view of the structure and other parameters of the device, the signal to arise effectively at the "and" gate 16. Immediately thereafter it is shut off through the feedback 25, by way of the delay 26 and the opposing control 27 which operates the flip-flop 14 back to vent situation by way of the vent 23.

When there is no coincidence signal in the system 11 and the signal in the branch passage 28 has no effect on the common "and" gate 19, it simply vents as at 28'. This being the case it is also true that in the system 10 "and" gate 16, there is no signal opposing the signal from the input 30 and it simply vents by way of vent 52.

A like situation occurs in the system 11, when there is an input pulse to the flip-flop 15 which is not coincidental or overlapping with respect to an input pulse in the system 10. The systems therefore operate independently and provide a "one" output signal in each case when there is no coincidence between the pulses of the system.

In the situation wherein the coincidence occurs, there is a pulse in the system 10, input 12, effective at the same time as there is a pulse in the system 11, input 13. The systems 10 and 11 both operate mainly in the same manner as described above but with a difference. Since now the pulses are coincident there is a signal both in the branch passage 28 from the system 10, and the branch passage 38 from the system 11. In this case as described, there is an output from the "and" gate 19 by way of the common output 41 to a control input 42, in the common flip-flop unit 20. This flip-flop unit 20 is normally in a venting state as through the passage 44, so that this signal now flips the unit over to provide an ouput in the passage 45.

This results in a signal in the cross passage 46 and simultaneous signals to the system 10 "and" gate 16, and the system 11 "and" gate, as at 47 and 48 respectively.

Note here that the delay units 29 and 39 in the systems 10 and 11 provide for the establishment of signals in the "and" gates 16 and 17, at 47 and 48, prior to the arrival of signals from the input flip-flops for the systems, that is the flip-flops 14 and 15.

When the signals arrive in input passages 30 and 40, they are met with the transverse signals in the inputs 47 and 48, and the result is a common single output signal in the common passages 54 and 57. However, the effective, more pertinent results for purposes of this invention is that output passages 52 and 55 of the units 16 and 17 respectively now register 0, in each case, instead of 1. They registered 1, as seen above, when there was a non-coincidence pulse coming through either one of the systems. When the pulses are in coincidence the same outputs 52 and 55 now register 0 and the coincidence pulse has thus been cancelled. The "one" signals of the common outputs of the "and" gate units 16 and 17 as at 54 and 57 when the signals are coincidence, may be used later as discussed previously, if it is desired not to lose any of the pulses from either system.

With respect to the flip-flop 20 and the delay 50 therein, this delay is twice that of the delay 26 or 36 in the input flip-flop. Thus a common signal, when pulses are coincident, very quickly gets to the gates 16 and 17, and then this signal is held by means of the delay 50 for a time double that required to shut off the pulse in either of the systems 10 or 11. When something of the nature of a step signal is provided, and one arrives at the common gate 19 prior to the other, but nevertheless they overlap a little, this tiny overlap will actually establish coincidence. It will actuate the flip-flop 20 and set up the delay 50 to hold the signals in the gates 16 and 17 until such time as the later of the two signals in the systems 10 and 11 have properly reached the gates 16 or 17 as the case may be.

This invention thus provides a new and useful fluid logic device, specifically an anti-coincidence device with respect to fluid pulse train, and further of a nature that provides a cancelling out to zero signal, when two such pulses are coincident.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

We claim:
1. A fluid logic anti-coincidence device wherein two pulse trains are compared, and wherein coincident pulses cancel each other out,
   said device comprising, in combination,
   a pair of parallel fluid systems each comprising a powered flip-flop input unit and a passive "and" gate output unit, and a fluid pulse train source for the input unit of each of said systems whereby one pulse train is provided for one of said systems and another pulse train is provided for the other of said systems,
   and a common fluid system operatively associated with both said parallel systems and comprising a passive "and" gate input unit and a powered flip-flop output unit,
   said device having time related delay means in said parallel and common systems,
   each of said pair of parallel fluid systems comprising, in said powered flip-flop input unit, a fluid power flow input, a branching vent output and a branching operating output from said flip-flop input unit, a pulse train control input to said flip-flop input unit as said pulse train source therefor, a feedback from said operating output as a control for said flip-flop input unit, delay means in said feedback, and a signal take-off passage from said feedback upstream of said delay means,
   a signal passage from said operating output to said passive "and" gate output unit, and delay means in said signal passage downstream of said feedback, and,
   said passive "and" gate output unit comprising said signal passage as one control input, another control input to said "and" gate unit, a direct output for each of said control inputs in the absence of the other, and an intermediate output for the interaction of both said control inputs,
   said common system comprising, in said passive "and" gate input therefor, two control inputs, one from said signal take-off passage from one of said parallel fluid systems and the other from the like passage of the other of said parallel fluid systems, a direct output for each of said control inputs in the absence of the other, and an intermediate output for the interaction of both said control inputs, and,
   said common system powered flip-flop output unit comprising, a fluid power flow source, a branching vent output, a branching operating output, a control input from said intermediate output of said common system "and" gate, a control passage from said operating output to both of said other control inputs to said passive "and" gates of said parallel systems, a control feedback from the signal of said operating output to said common system flip-flop unit, and delay means in said control feedback without applying said delay to said control passage,
   said time relation of said delay means being as follows: shortest time delay, the open systems from said pulse train inputs through said common system to the "and" gate outputs of said parallel systems; the next longest delay, the systems from said pulse train inputs directly to the "and" gate outputs of said parallel systems; the next longest delay, the feedback systems of the flip-flop units of said parallel systems; and the longest delay, the feedback system of the flip-flop output unit of said common system.

References Cited

UNITED STATES PATENTS

| | | | |
|---|---|---|---|
| 3,107,850 | 10/1963 | Warren | 137—81.5 |
| 3,128,040 | 4/1964 | Norwood | 137—81.5 |
| 3,155,825 | 11/1964 | Boothe | 137—81.5 |
| 3,191,611 | 6/1965 | Bauer | 137—81.5 |
| 3,208,464 | 9/1965 | Zilberfarb | 137—81.5 |
| 3,238,961 | 3/1966 | Hatch | 137—81.5 |
| 3,240,219 | 3/1966 | Dexter | 137—81.5 |
| 3,253,605 | 5/1966 | Grubb | 137—81.5 |

OTHER REFERENCES

IBM Technical Disclosure Bulletin, vol. 5, No. 6, November 1962, A. E. Mitchell, "Fluid Binary Full Adder."

IBM Technical Disclosure Bulletin, vol. 6, No. 1, June 1963, H. R. Grubb, "Fluid Binary Fuller Adder."

IBM Technical Disclosure Bulletin, vol. 6, No. 4, September 1963, A. D. Mitchell, "Binary Full Adder."

M. CARY NELSON, *Primary Examiner.*

W. R. CLINE, *Assistant Examiner.*